United States Patent
Cowell et al.

(10) Patent No.: US 10,274,046 B2
(45) Date of Patent: Apr. 30, 2019

(54) SWIVEL ASSEMBLIES

(71) Applicant: Treemagineers Ltd., Scotland (GB)

(72) Inventors: Christopher Sidney Cowell, Scotland (GB); Elliot James Tanner, North Wales (GB)

(73) Assignee: TREEMAGINEERS LTD., Pitlochry (GB)

( * ) Notice: Subject to any disclaimer, the term of this patent is extended or adjusted under 35 U.S.C. 154(b) by 280 days.

(21) Appl. No.: 15/142,010

(22) Filed: Apr. 29, 2016

(65) Prior Publication Data

US 2016/0319905 A1     Nov. 3, 2016

(30) Foreign Application Priority Data

May 1, 2015   (GB) ................................ 1507562.5
Apr. 27, 2016   (EP) ................................ 16167251

(51) Int. Cl.
*F16G 15/08*     (2006.01)

(52) U.S. Cl.
CPC ................................ *F16G 15/08* (2013.01)

(58) Field of Classification Search
CPC .. Y10T 24/4755; Y10T 24/47; Y10T 24/4764; Y10T 24/905; Y10T 24/908; Y10T 403/32213; F16G 15/08
USPC .......................................... 294/215; 403/78
See application file for complete search history.

(56) References Cited

U.S. PATENT DOCUMENTS

| | | | |
|---|---|---|---|
| 1,150,892 A * | 8/1915 | Sherwood | F16G 15/08 24/265 A |
| 1,927,367 A | 9/1933 | Heale et al. | |
| 2,387,599 A | 10/1945 | Miller et al. | |
| 2,639,480 A * | 5/1953 | Magid | F41C 23/02 24/2.5 |
| 2,801,120 A * | 7/1957 | Shepard | B63B 21/04 403/164 |
| 3,270,494 A * | 9/1966 | Holmes | B63B 21/08 114/108 |
| 3,297,293 A | 1/1967 | Andrews et al. | |

(Continued)

FOREIGN PATENT DOCUMENTS

GB      2480060 A      9/2011

OTHER PUBLICATIONS

European Search Report issued in Application No. 16167251, dated Sep. 21, 2016.

(Continued)

*Primary Examiner* — Amber R Anderson
*Assistant Examiner* — Nahid Amiri
(74) *Attorney, Agent, or Firm* — Young & Thompson (57) ABSTRACT

A swivel assembly is disclosed that allows first and second sub-assemblies to swivel with respect to one another. The assembly comprises a first component and a second component, at least one having a connection formation for connection to another object. An interconnection assembly interconnects the components such that they are free to rotate about an axis. The interconnection assembly comprises an axle secured for free rotation about the axis within a recess of the second component. The axle is retained within the recess by a bearing secured within the recess by a cap located in an opening of the recess that is directed towards the first component, the axle extending through the cap along the axis for connection with the first component.

13 Claims, 11 Drawing Sheets

(56) References Cited

U.S. PATENT DOCUMENTS

| | | | | |
|---|---|---|---|---|
| 4,431,352 A * | 2/1984 | Andrews | ................... | B66C 1/66 248/499 |
| 4,482,264 A * | 11/1984 | Kodera | ................... | A01K 91/03 403/165 |
| 4,558,979 A * | 12/1985 | Andrews | ................... | B66C 1/66 248/499 |
| 4,570,987 A | 2/1986 | Wong et al. | | |
| 4,669,907 A | 6/1987 | Patton | | |
| 4,708,382 A * | 11/1987 | LaCount | ................... | B66C 1/34 294/82.1 |
| 5,274,887 A * | 1/1994 | Fudaki | ................... | A44B 11/28 24/265 H |
| 5,566,428 A * | 10/1996 | Takahashi | ............ | B29C 45/0017 24/265 H |
| 5,769,475 A * | 6/1998 | Tylaska | ................... | F16G 15/04 24/600.1 |
| 5,937,491 A * | 8/1999 | Chih | ...................... | A45C 13/00 24/265 H |
| 6,554,524 B1 | 4/2003 | Smith | | |
| 6,584,655 B1 * | 7/2003 | Cardwell, III | .......... | F16B 45/00 24/324 |
| 6,694,574 B1 * | 2/2004 | Sheng | ................... | F16G 15/08 24/265 H |
| 6,948,218 B1 * | 9/2005 | Donze | .................. | A01K 27/005 119/774 |
| 8,973,705 B2 * | 3/2015 | Guthrie | .............. | A62B 35/0037 182/3 |
| 2001/0045085 A1 * | 11/2001 | Schmidt | ................. | A01K 75/00 54/85 |
| 2006/0107499 A1 * | 5/2006 | Wu | ........................ | F16B 45/00 24/370 |
| 2008/0141499 A1 * | 6/2008 | Chung | ................... | F16B 45/02 24/265 H |
| 2009/0208274 A1 | 8/2009 | Liang | | |
| 2009/0265901 A1 * | 10/2009 | Berney | ................. | F16B 45/00 24/591.1 |
| 2012/0311830 A1 * | 12/2012 | Schlipper | ............... | F16B 45/04 24/600.4 |
| 2015/0014367 A1 | 5/2015 | Maurice et al. | | |
| 2015/0143674 A1 * | 5/2015 | Maurice | ................. | F16B 45/04 24/598.7 |

OTHER PUBLICATIONS

GB Search Report, dated Oct. 22, 2015, from corresponding GB application.

\* cited by examiner

SWIVEL ASSEMBLIES

BACKGROUND TO THE INVENTION

Field of the Invention

This invention relates to swivel assemblies and to swivels.

Summary of the Prior Art

A swivel is an anti-torsion device for reducing the twisting loads within climbing and hauling lines. Traditionally, these have constituted of an assembly that includes pair of swivel bodies with a thrust or roller bearing joining the two bosses to enable them to spin independently.

Swivels come in a range of sizes, shapes and connection arrangements. An assembly that constitutes a swivel may typically have two swivel eyes or one swivel eye and a boss or two bosses. In general, an eye is used to connect the swivel to a carabiner and a boss is used to connect the swivel to a flexible line, lanyard or shackle.

Figure 1:
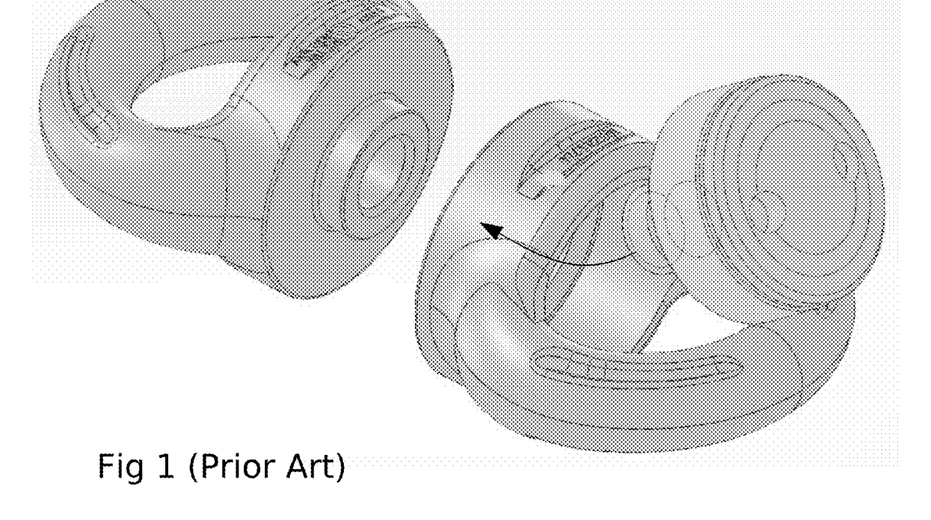
FIGS. 1 and 2 illustrate conventional swivels and have already been discussed.
Figure 2:
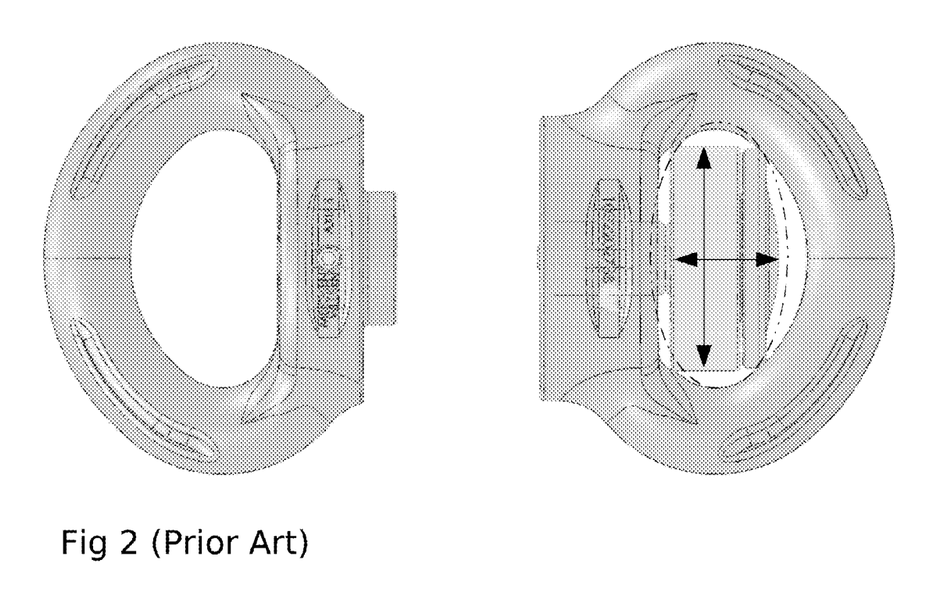

It is desirable that the swivel and shackle body be as short as possible to reduce the height of any system of which it is a component and to ensure minimal leverage on the swivel body. As illustrated in FIGS. 1 and 2, during manufacture of a conventional swivel assembly, the bearing must pass through one of the attachment eyes to connect with the other eye or boss. This means that the size of the swivel eye is determined by the size of the bearing that it must accommodate, which is, in turn, determined by the working load of the swivel assembly. This places a lower limit on the size of a swivel that can be constructed using standard techniques.

SUMMARY OF THE INVENTION

An aim of this invention is to provide a swivel that can be made smaller than is the case with conventional swivels.

To this end, from a first aspect, the present invention provides a swivel assembly comprising a first component and a second component, at least one of which component may have a connection formation for connection to another object, and an interconnection assembly interconnecting the components such that they are free to rotate about an axis, characterised in that the interconnection arrangement comprises an axle secured for free rotation about the axis within a recess of the second component, the axle being retained in the recess by a bearing secured within the recess by a cap located in an opening of the recess, the opening being directed towards the first component, and the axle extending through the cap along the axis for connection with the first component.

This arrangement means that no component has to be inserted into the second component other than through a face directed to the first component, thereby removing the need to provide sufficient axial dimension to accommodate assembly of the swivel, as is the case of known proposals.

Remote from the opening, the recess may be blind, terminating within second component, or it may have a through hole. In the latter case, the through hole is typically, but not necessarily, of insufficient size to allow the bearing to pass through it.

The axle bearing may be a rolling-element bearing such as a thrust bearing. Other forms of rolling-element bearing may be used such as a ball bearing, a roller bearing or an angular-contact bearing or bushing. The axle may have a head portion, the thrust bearing being within the recess between the second component (specifically, between the cap) and the head portion. The bearing may be retained within the recess by a cap secured, for example by interengaging screw threads, to the second component. Advantageously, the cap may be removable to allow the first component to be exchanged for another.

The axle may have an axial projecting part that projects from the second component for connection to the first component. Such connection may be fixed to prevent mutual rotation of the axle and the first component. The connection may be made by threaded engagement between a portion of the axle and the first component and may be secured by a locking piece, such as a grub screw that bears against the axle.

Typically, a compressive thrust bearing is located between the first and second components to react forces that compress the components together along the axis. To minimise axial length of the swivel, the compressive thrust bearing may be constituted by a washer disposed between the components.

For example, each connection formation is a shackle or a loop, or any or a wide range of other functional formations. The connection formations may be functionally similar to one another or different as required by the function of the swivel.

In other embodiments, one or other of the first component or the second component may be fixed. For example, it may be part of a fixed structure. Such embodiments allow a swivelling interconnection to be made with a wide variety of fixed objects. In such examples, the fixed structure might typically constitute the second component, the essential feature being a recess within which the connection assembly can be received.

From a second aspect, the invention provides a method of manufacture of a swivel assembly comprising a first component and a second component, at least one of which component having a connection formation for connection to another object, and an interconnection assembly interconnecting the components such that they are free to rotate about an axis, including steps of securing an axle of the interconnection assembly for free rotation about the axis by inserting the axle into a recess of the second component through an opening of the recess, the opening being directed towards the first component, and retaining the axle in the recess by securing a bearing within the by recess a means of a cap to cause the axle to extend through the cap along the axis for connection with the first component.

Since the bearing is inserted into a recess of the second component that faces the first component, access is required only to that face of the second component in which the recess is formed. This facilitates the construction of swivel connections to a wider range of components and structures than would be possible using conventional construction arrangements.

The step of securing the cap in the recess may include engagement, tightening and locking of screw threads on the cap and in the recess.

The axle is typically connected to the first component prior to the connection of the connection assembly to the second component.

Embodiments of the invention will now be described in detail, by way of example, and with reference to the accompanying drawings.

DETAILED DESCRIPTION OF THE PREFERRED EMBODIMENTS

Figure 3:
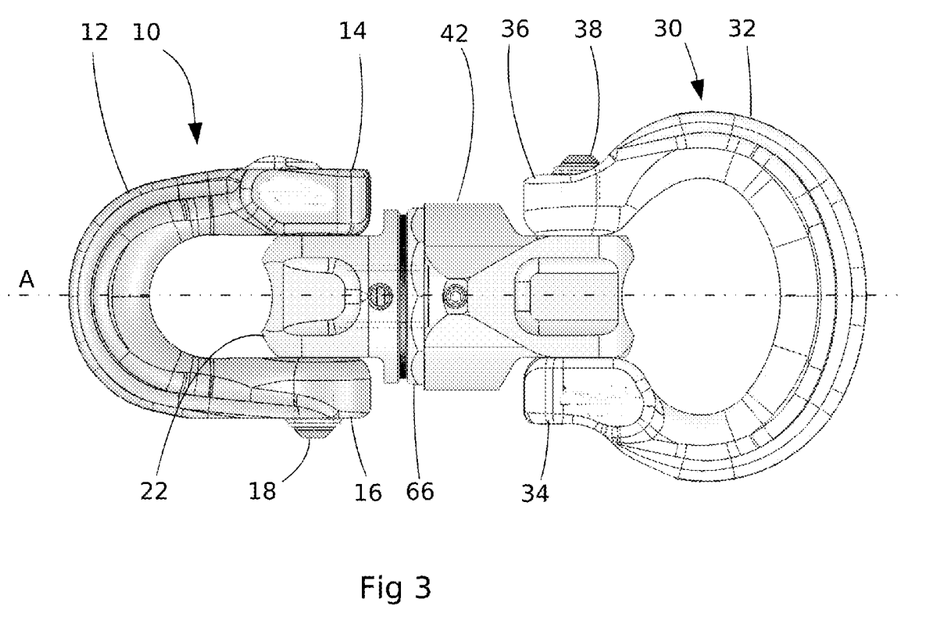
FIGS. 3 and 4 are front and side views of a swivel being a first embodiment of the invention.
Figure 4:
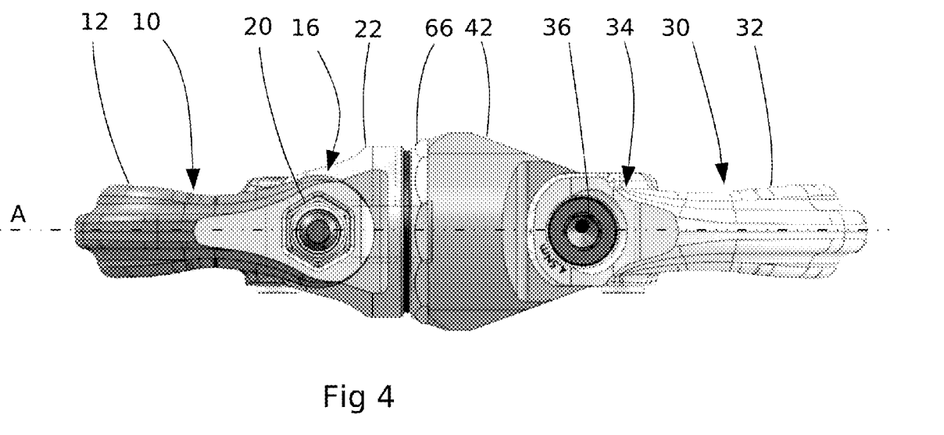
Figure 5:
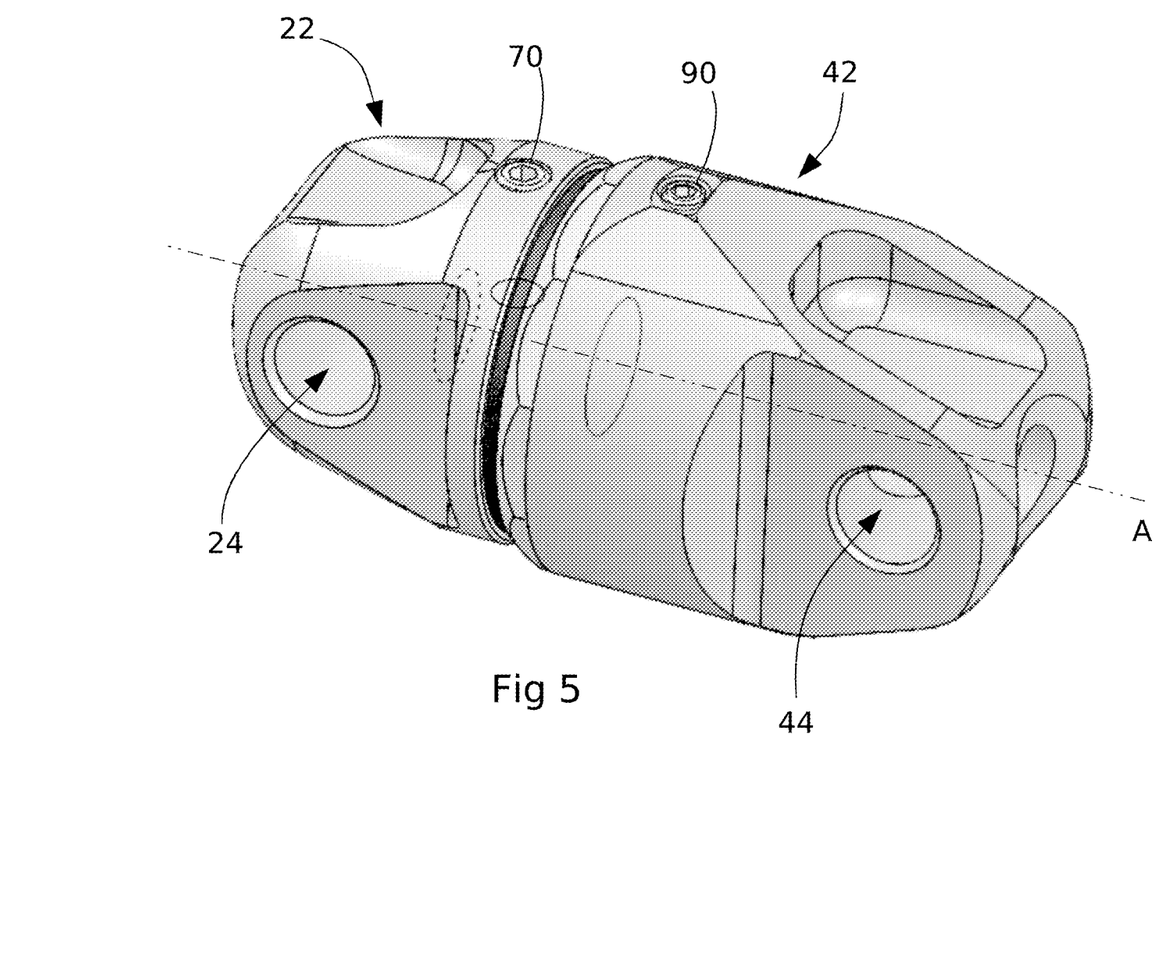
FIG. 5 shows a sub-assembly of the swivel of FIGS. 3 and 4.

With reference to FIGS. 3 and 4, a first embodiment of the invention provides a swivel that has two interconnected shackle sub-assemblies 10; 30. The sub-assemblies 10; 30 are free to rotate with respect to one another about a pivot axis A.

Each shackle sub-assembly 10; 30 includes a shackle loop 32; 12 that extends in a U-shaped or C-shaped profile, each having first and second attachment portions 14, 16; 34; 36. The attachment portions 14, 16; 34; 36 have flat surfaces that are parallel to and face one another. Each shackle has respective coaxial bores formed through its attachment portions 14, 16; 34; 36. The bore of each of the first attachment portions 14; 34 is counterbored and the bore of each of the second attachment portions 16; 36 is formed with a recess of hexagonal cross-section. Each shackle sub-assembly further includes a respective axle bolt. The bolt has a head that has a cylindrical periphery and a recessed hexagonal drive socket 36 (just one being visible), a plain shaft, and an externally threaded end portion 18, 38. Each head is retained within the corresponding counterbore, and the threaded end portion 18, 38 is in threaded engagement with a hexagonal nut 20 (just one being visible) that is retained in the hexagonal recess, in which rotation is prevented.

The first and second shackle sub-assemblies 10; 30 are each connected to a respective boss, which will be referred to as the small boss 22 and the large boss 42, and which respectively constitute a first component and a second component of this embodiment. Each boss 22; 42 has a respective through-bore 24; 44 that extends between flat, parallel external surfaces of the boss. The shaft of each bolt passes through a respective bore 24; 44 to secure each shackle 12; 32 to its boss 22; 42, such that the shackle can pivot about the axis B; C of the bolt. The large boss 42 includes a recess 46, the recess 46 having an opening that is directed towards the small bass in the assembled swivel assembly. A length of the recess 46 in the large boss 42 adjacent to the opening has an internal screw thread that is centred upon the pivot axis A. Remote from the opening, the recess 46 may be blind, terminating within the large boss, or it may have a through hole. In the latter case, the through hole is typically, but not necessarily, of insufficient size to allow the interconnection assembly (to be described below) to pass through it.

The small boss 22 includes an axial tube portion 26 that is externally cylindrical and has an internally threaded cylindrical bore. A washer 28 is carried on the tube portion 26.

The arrangement for interconnection of the bosses 22; 42 will now be described.

Figure 6:
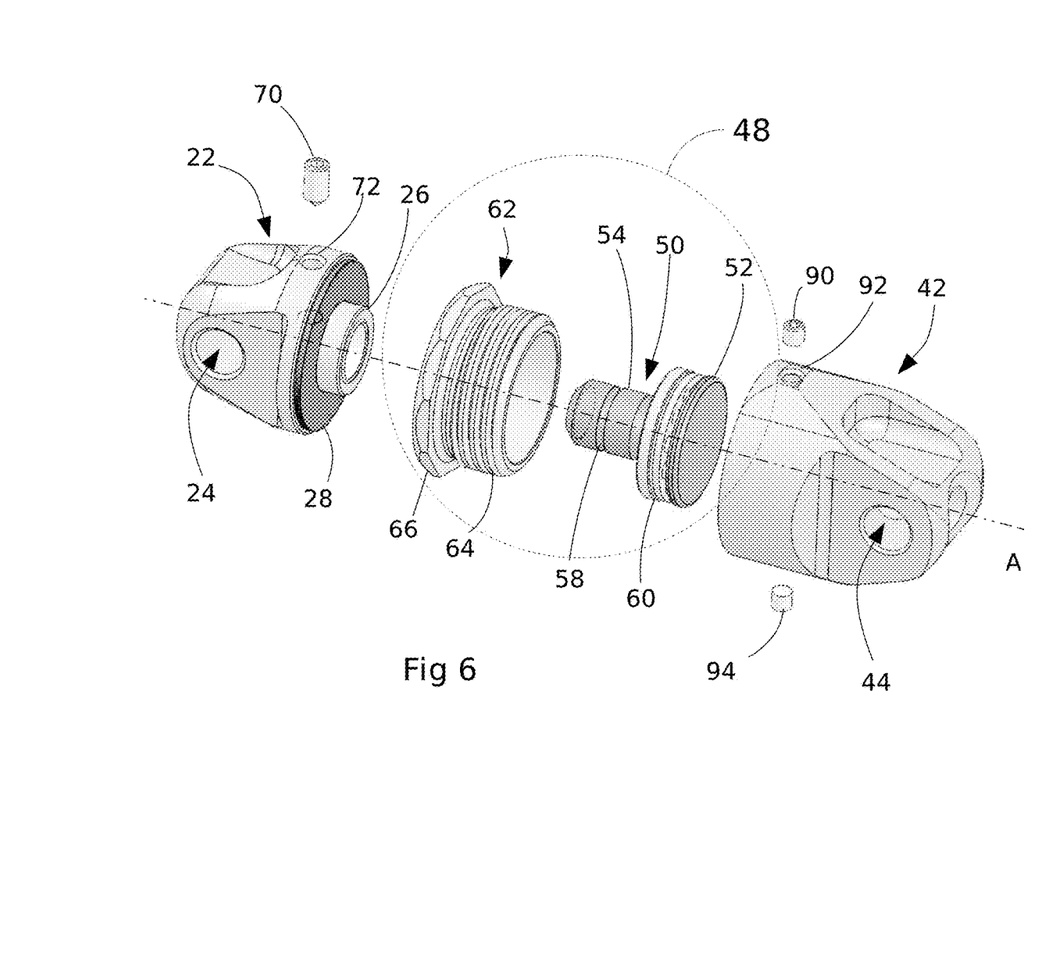
FIG. 6 is an exploded view of the sub-assembly of FIG. 5.

The interconnection assembly 48, shown in FIG. 6, includes a main axle 50. The main axle 50 includes a disc-shaped head 52 and a cylindrical shaft 54 extending normally from and central of the head, at least an end portion of the shaft 54 having an external thread (not shown) and the free end of the shaft 54 remote from the head 52 being chamfered. The shaft 54 is externally threaded and is in threaded engagement with a threaded portion of the bore of the tube portion 26 of the small boss 22. The head 52 can fit within the recess 46 of the large boss 42. In the assembled interconnection arrangement, the shaft 54 is coaxial with the pivot axis A. A peripheral groove 58 is formed on the shaft 54. A thrust bearing 60 is carried on the shaft 54, one race of which is in contact with the head 52 and the other race being free to rotate with respect to the main axle 50.

The interconnection assembly 48 additionally includes a cap 62. The cap 62 has an externally threaded spigot portion 64 and a head 66 at one axial end of the spigot portion 64, the head 66 projecting radially beyond the spigot portion 64 and being formed with a plurality of external flats. An axial circular aperture passes through the head 66.

Figure 7:
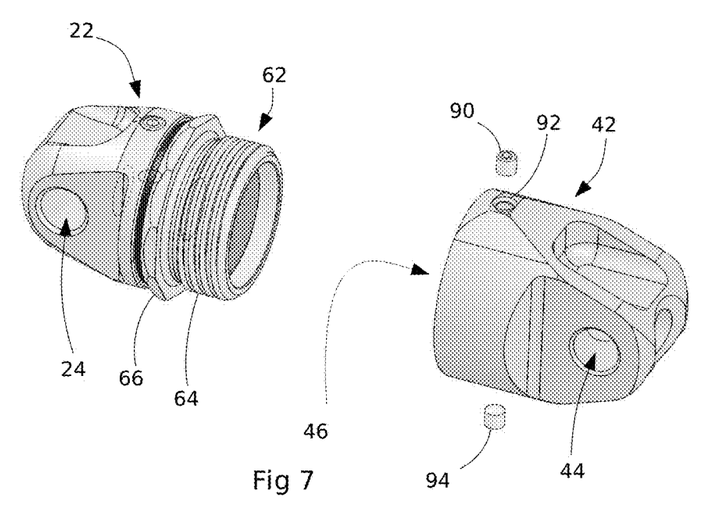
FIG. 7 shows the partially-assembled sub-assembly of FIG. 5.

With the thrust bearing 60 in place on the main axle 50, the shaft 54 of the main axle is inserted through the aperture of the cap 62 whereby a part of it projects from the head 66. To connect the interconnection assembly to the first component, the projecting part is screwed into the axial tube portion 26 of the small boss 22 to cause the cap 62 to closely approach the washer. A grub screw 70 is inserted into a radial threaded bore 72 in the small boss 22, the grub screw 70 having a pointed tip that enters the groove 58 on the shaft 54 to lock it in place within the small boss 22. In addition, adhesive may be applied to the thread of the shaft 54 to lock it within the axial tube portion 26. To connect the interconnection assembly to the second component, the spigot portion 64 of the cap 62 is screwed into the recess 46 of the large boss 42, the flats on its head 66 being used to tighten the cap 62 in place. Grub screws 90, 94 are inserted into radial threaded bores 92 in the large boss 42, the grub screw 90 making contact with the spigot portion 64 to lock it in place within the large boss 42. Thus, the small and the large bosses 22, 42 can rotate freely with respect to one another about the axis A, the thrust bearing 60 preventing separation of the bosses 22, 24 along the axis A and the washer 28 acting as a thrust bearing surface for the cap 62 when the interconnection assembly 48 is loaded in compression.

Figure 8:
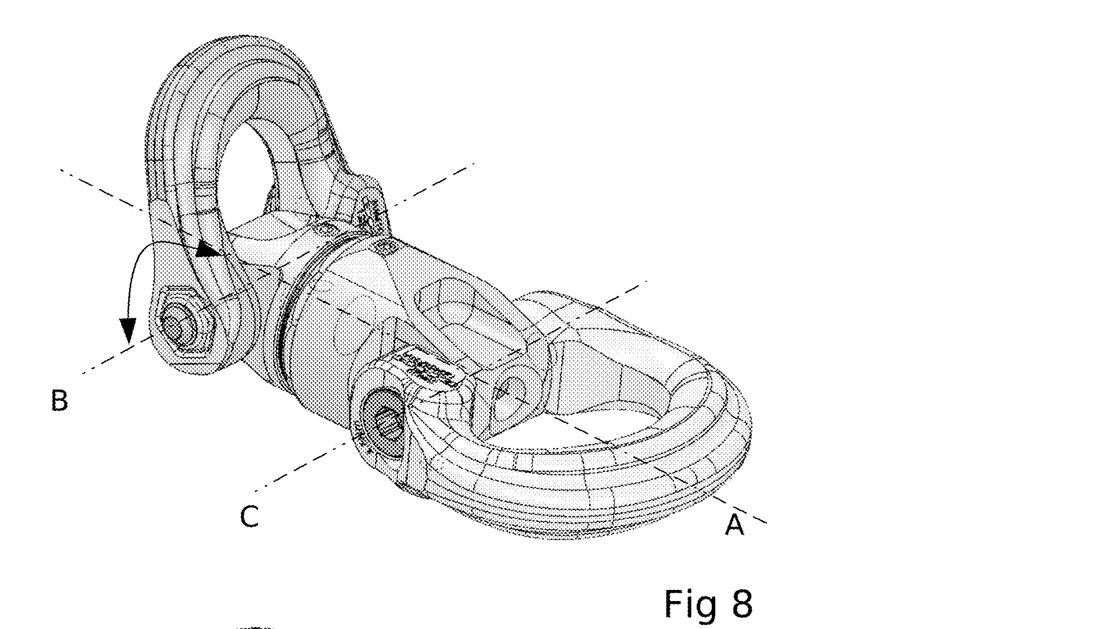
FIGS. 8 and 9 show pivotal relative movements of the components of an embodiment of the invention.
Figure 9:
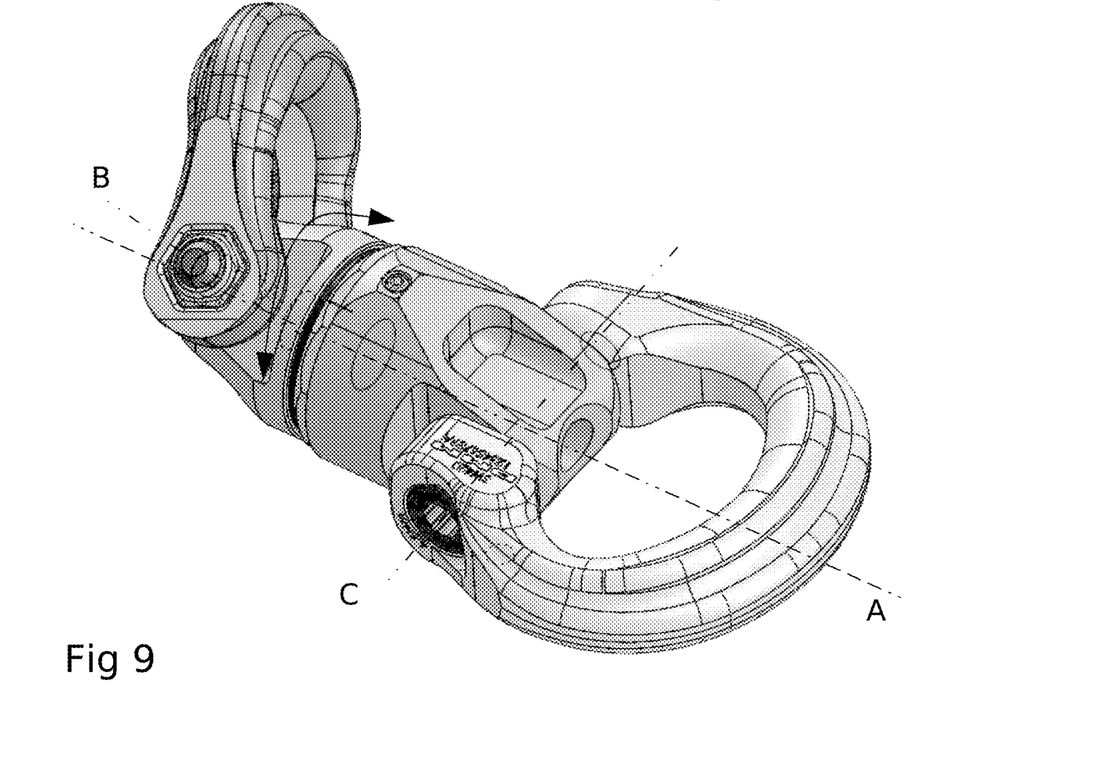

Thus, in the complete swivel, the interconnection assembly 48 allows mutual rotation of the bosses and the shackles carried on them about the axis A, and the axle bolts allow rotation of the shackle loops 12, 32 with respect to the bosses 22, 42 about the transverse axes B, C as shown in FIGS. 8 and 9.

It will be seen that the length of the swivel constructed in this manner is independent of the diameter of the thrust bearing 60.

Figure 10:
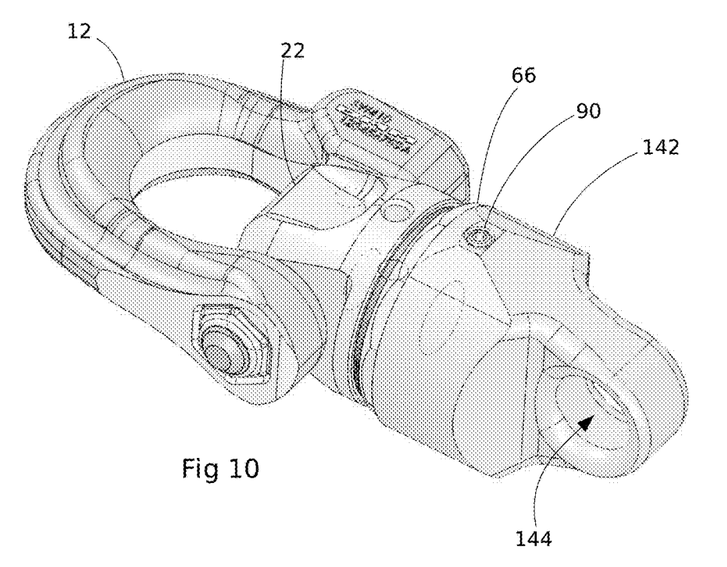
FIG. 10 shows a second embodiment of the invention

The shape and form of each boss 22, 42 is determined only to the extent that it must fit with the main axle 50 and the cap 62. This allows swivelling components of many alternative configurations to be assembled readily. For example, in FIG. 10, there is shown a swivel that shares all of its components with the embodiment described above with the exception of the large boss and its shackle. In this case, the large boss 142 does not have a shackle attached, but instead has a large transverse bore 144 that has radiused entries to transverse opposite sides of the boss 142. A connection device such as a carabiner or a line or sling can be passed through the bore 144 to secure it to the swivel.

Figures 11, 12, 13:
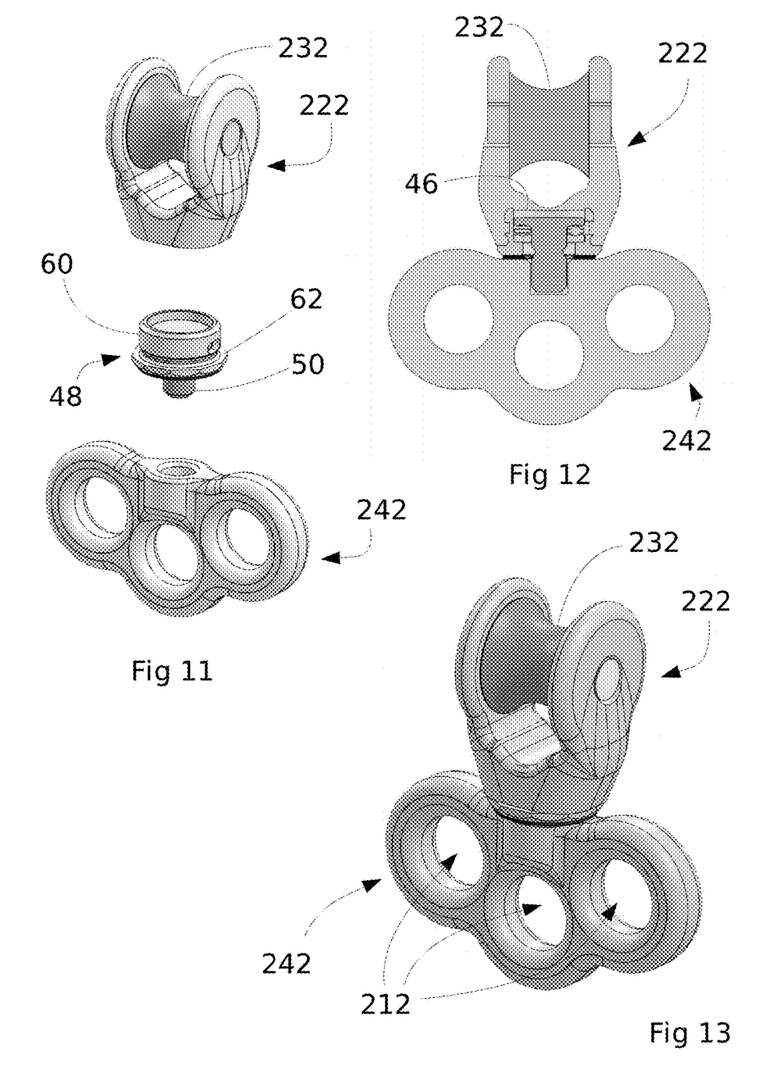
FIGS. 11 to 13 are, respectively, exploded, sectional and general views of a third embodiment of the invention.

Likewise, in the embodiment of FIGS. 11 to 13, the large boss 222 carries a sheave 232 that is free to rotate about an axis that is perpendicular to the pivot axis. The small boss 242 is formed with three eyes 212 through which a connector, rope or other component can be passed. The interconnection assembly 48 includes the main axle 50, thrust bearing 60 and cap 62 as with the preceding embodiments.

Figure 14:
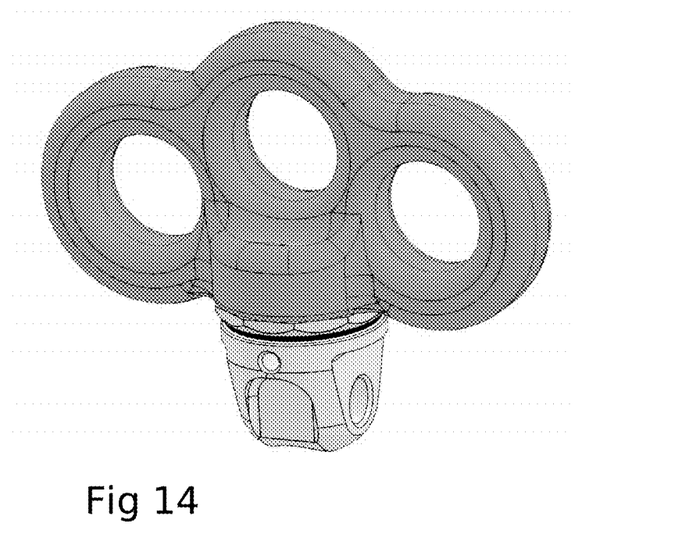
FIGS. 14 to 18 are further alternative embodiments of the invention.
Figure 15:
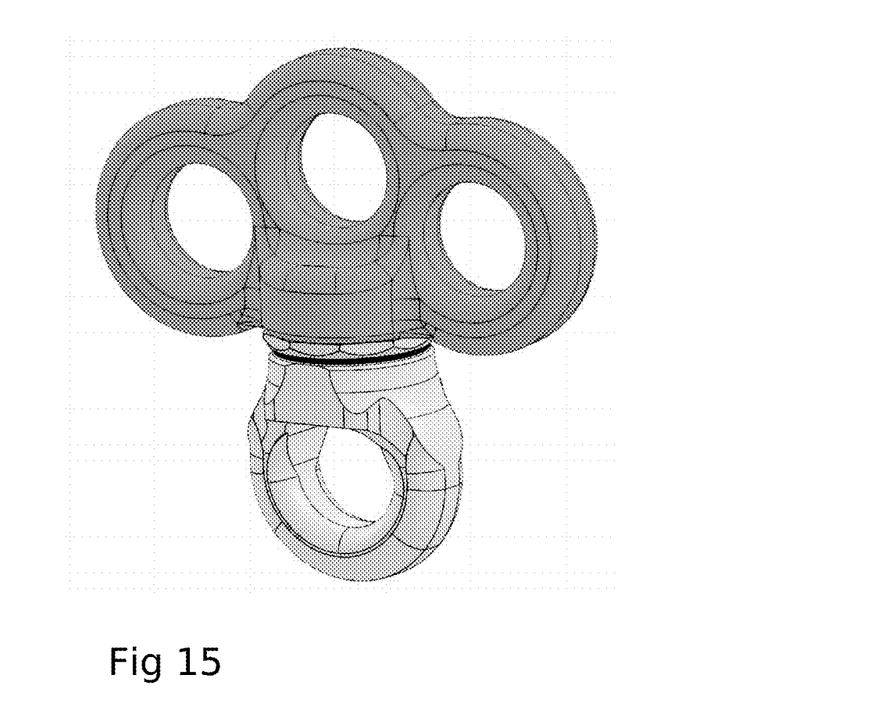
Figure 16:
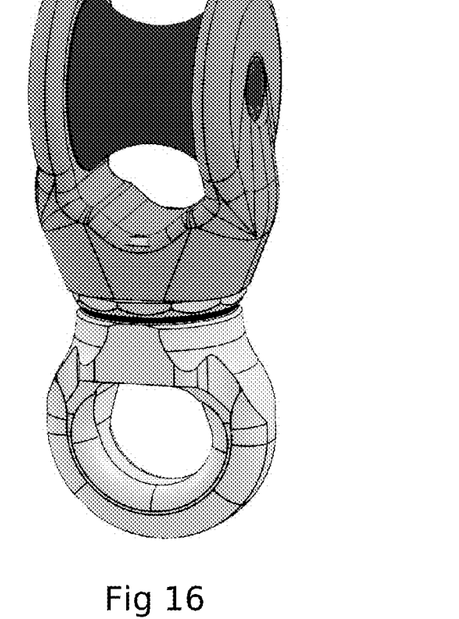
Figure 17:
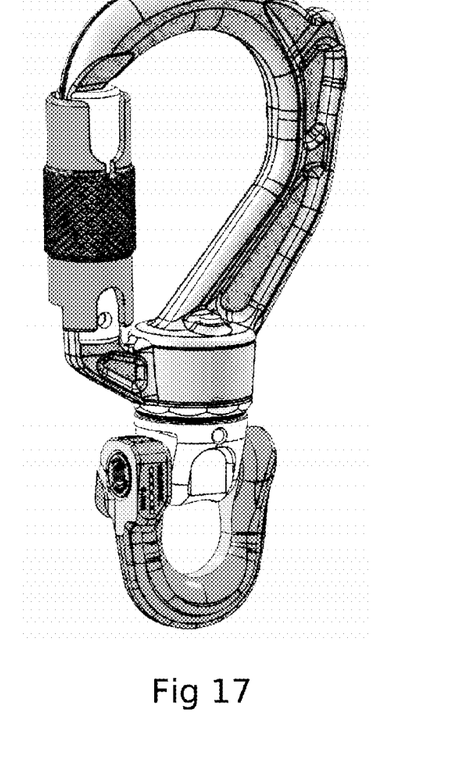
Figure 18:
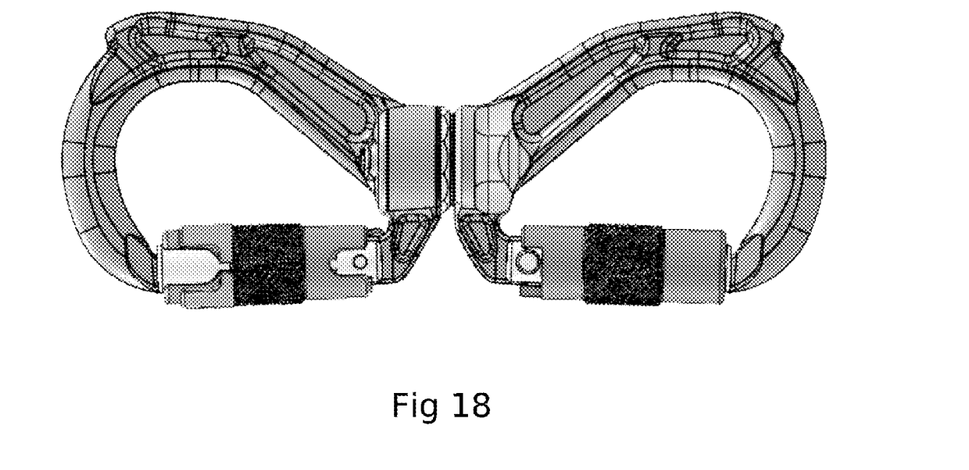
Figure 19:
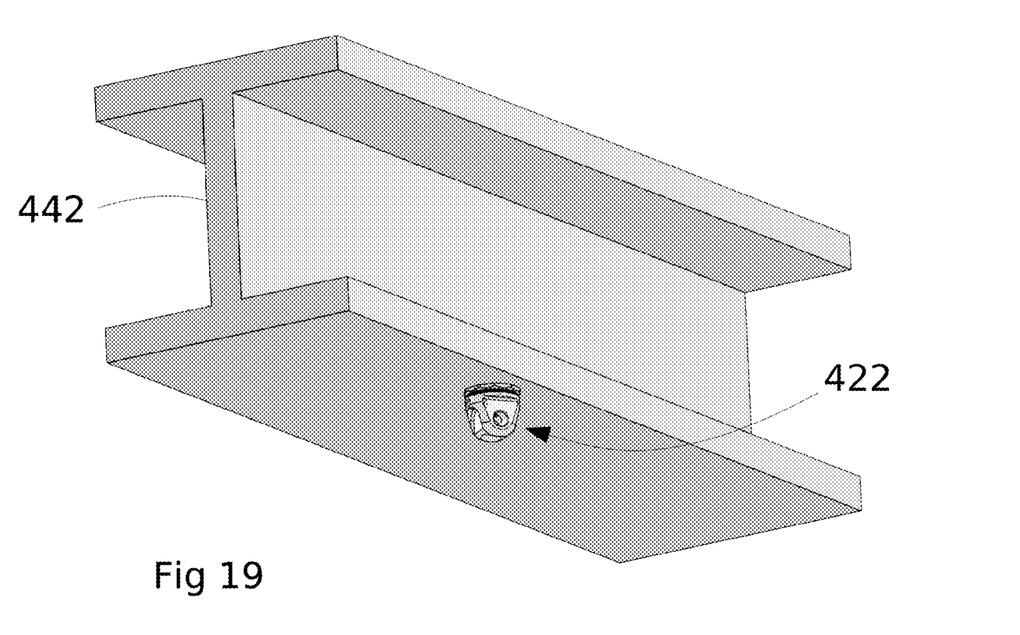
FIGS. 19 and 20 show an embodiment of the invention in which one component is a fixed structure
Figure 20:
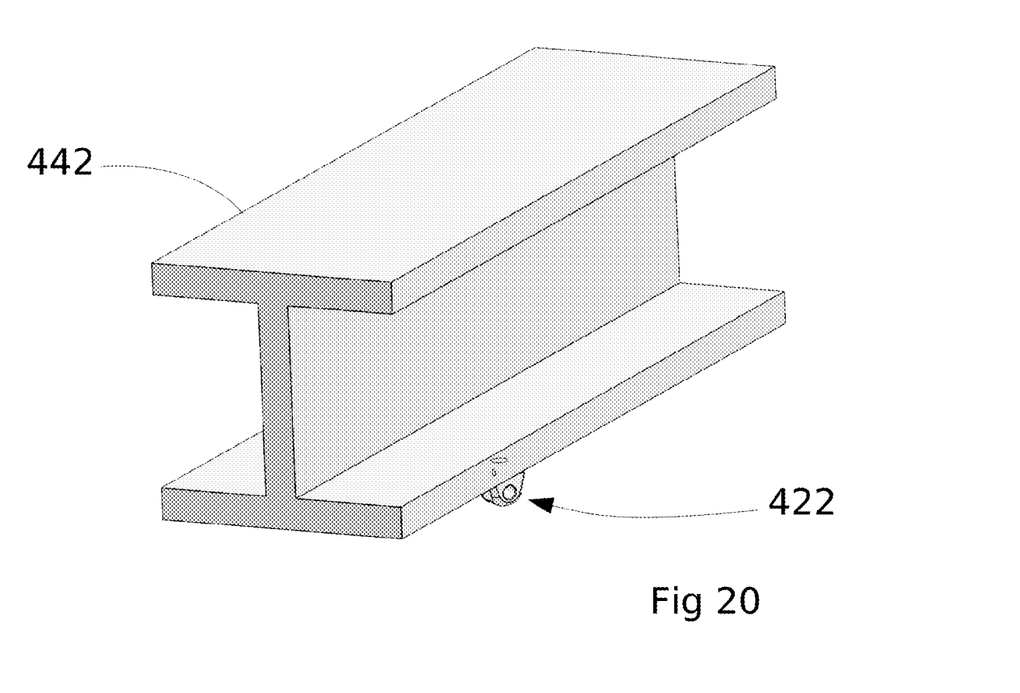
Figure 21:
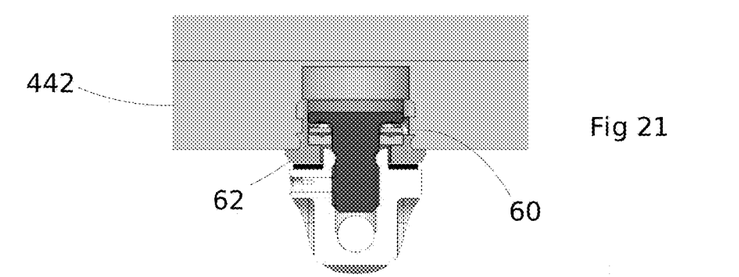
FIGS. 21 to 23 are, respectively, sectional, exploded and exploded sectional views of the embodiment of FIGS. 19 and 20.
Figures 22, 23, 24:
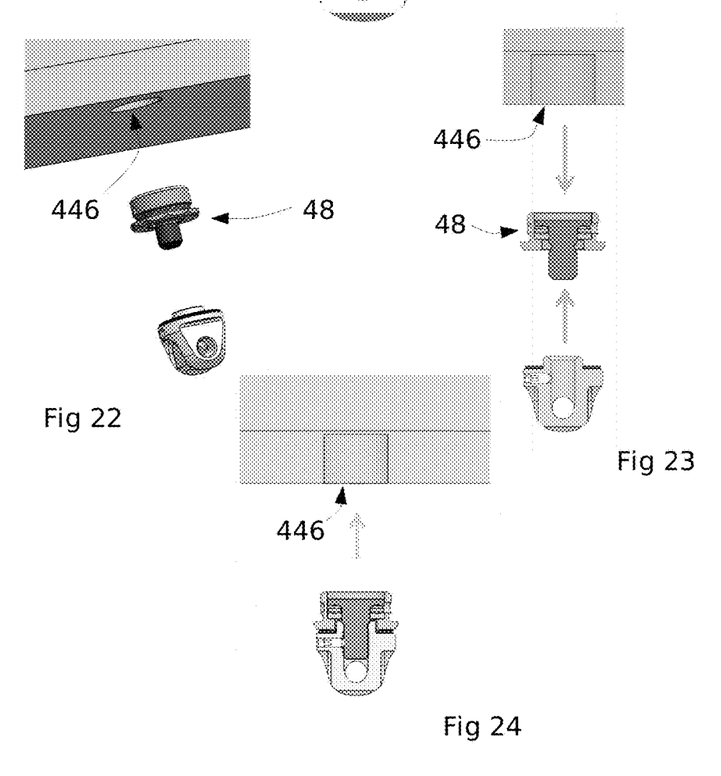
FIG. 24 shows the embodiment of FIGS. 19 and 20 during assembly.

The embodiments of FIGS. 14 and 15 use a large boss, which is formed with three eyes. The embodiment of FIG. 14 uses the same small boss as the first embodiment, and the embodiment of FIG. 15 has a small boss that provides a single eye. Yet further embodiments that incorporate combinations of sheaves, eyes, shackles and snap hooks (karabiners) are shown in FIGS. 16 to 18.

In the embodiments described above, both of the first and the second components are components that are relatively small components, and the assembled swivel is a piece of equipment that can readily be carried about a person. However, this embodiments of the invention are not limited in this way. The essential characteristic of the second component is that it has a recess in which the bearing and axle can be received and is able to receive and be secured with the cap to retain the bearing.

In the embodiment shown in FIGS. 19 to 24, the second component is a fixed structure, in this case, a steel structural component 442 of a building. The recess is a blind, tapped bore 446 in the structural component 442. The swivel is assembled by connecting the first component 422 (which can take a form similar to any of the second components described above or may be different) to the interconnection assembly 48 as described above. Then, the interconnection assembly is connected to the second component by screwing the cap 62 into the bore 446. The first component 422 is now connected to and can rotate with respect to the structural component 442.

Thus, the present invention provides a means by which many diverse swivel assemblies, for example, for use as components in safety systems for climbing and rope access, arborism and other applications, can be constructed that allow mutual rotation between components, including but not limited to, the swivels and swivel assemblies described herein.

What is claimed is:

1. A swivel assembly comprising:
   a first component and a second component at least one of said first component and said second component having a connection formation for connection to another object, and
   an interconnection assembly interconnecting the components such that said first component and said second component are free to mutually rotate about an axis,
   wherein the interconnection assembly comprises an axle secured for free rotation about the axis within a recess of the second component, the axle being retained in the recess by a bearing secured within the recess by a cap located in an opening of the recess, the cap being secured to the second component by interengaging screw threads, the opening being directed towards the first component, and the axle extending through the cap along the axis for connection with the first component.

2. The swivel assembly of claim 1 wherein the bearing is one of a rolling element bearing, a thrust bearing and a bushing.

3. The swivel assembly of claim 2 wherein the axle has a head portion, the thrust bearing being within the recess between cap and the head portion.

4. The swivel assembly of claim 1 wherein the cap is removably located in the recess thereby allowing the first component to be exchanged for another.

5. The swivel assembly of claim 1 wherein the axle has an axial projecting part that projects from through the cap for connection to the first component.

6. The swivel assembly of claim 1 having a compressive thrust bearing located between the first and second components, such as a washer disposed surrounding the axle between the first and second components.

7. The swivel assembly of claim 1 wherein each connection formation includes one or more of a shackle, a loop, a sheave, and a snap hook.

8. The swivel assembly of claim 1 wherein the first and the second components include bosses, each connection formation being connected to or integral with a boss.

9. The swivel assembly of claim 1 having two connection formations that are functionally similar to one another.

10. The swivel assembly of claim 1 having two connection formations that are functionally dissimilar from one another.

11. The swivel assembly of claim 1 wherein one of the first component or the second component is part of a fixed structure.

12. A swivel assembly comprising:
   a first component and a second component at least one of said first component and said second component having a connection formation for connection to another object, and
   an interconnection assembly interconnecting the components such that said first component and said second component are free to mutually rotate about an axis,
   wherein the interconnection assembly comprises an axle secured for free rotation about the axis within a recess of the second component, the axle being retained in the recess by a bearing secured within the recess by a cap located in an opening of the recess, the opening being directed towards the first component, the axle extending through the cap along the axis for connection with the first component, and the axle being is fixed to prevent mutual rotation of the axle and the first component.

13. The swivel assembly of claim 12 wherein the axle is fixed in threaded engagement with the first component.

* * * * *